(12) United States Patent
Voncken et al.

(10) Patent No.: US 11,355,008 B2
(45) Date of Patent: Jun. 7, 2022

(54) LIGHTING SYSTEM WITH TRAFFIC REROUTING FUNCTIONALITY

(71) Applicant: SIGNIFY HOLDING B.V., Eindhoven (NL)

(72) Inventors: Ralf Gertruda Hubertus Voncken, Eindhoven (NL); Dominika Lekse, Eindhoven (NL); Alexandre Georgievich Sinitsyn, Veldhoven (NL); Judith Hendrika Maria De Vries, Budel-Schoot (NL); Tom Verhoeven, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/626,601

(22) PCT Filed: Jun. 22, 2018

(86) PCT No.: PCT/EP2018/066802
§ 371 (c)(1),
(2) Date: Dec. 26, 2019

(87) PCT Pub. No.: WO2019/002144
PCT Pub. Date: Jan. 3, 2019

(65) Prior Publication Data
US 2020/0126410 A1    Apr. 23, 2020

(30) Foreign Application Priority Data

Jun. 30, 2017 (EP) .................................... 17178932

(51) Int. Cl.
*G08G 1/01* (2006.01)
*G01C 21/34* (2006.01)
(Continued)

(52) U.S. Cl.
CPC ....... *G08G 1/0145* (2013.01); *G01C 21/3461* (2013.01); *G01C 21/3492* (2013.01);
(Continued)

(58) Field of Classification Search
CPC .... G08G 1/0145; G08G 1/0116; G08G 1/015; G08G 1/087; G08G 1/096816; G08G 1/096827; G01C 21/3461; G01C 21/3492
See application file for complete search history.

(56) References Cited

U.S. PATENT DOCUMENTS

2003/0006909 A1* 1/2003 Basson .................. G08G 1/087
340/906
2006/0138329 A1    6/2006 Wu
(Continued)

FOREIGN PATENT DOCUMENTS

CN    102192432 A    9/2011
CN    204420507 U    6/2015
(Continued)

*Primary Examiner* — Hussein Elchanti
(74) *Attorney, Agent, or Firm* — Daniel J. Piotrowski (57) ABSTRACT

A lighting system for illuminating an environment, the lighting system comprising a plurality of lighting modules (111, 112, 113), the lighting modules comprising a light source (111a) for emitting light, illuminating an area, an acoustic sensor (111b) arranged for sensing noise in the area, a network interface configured to allow the lighting module to send noise data via a network, and a vehicle routing device (120) comprising: a first network interface (121) configured to receive noise data from the plurality of lighting modules via the network, a processor circuit arranged to calculate noise metrics for different regions (341-344) in the environment from the received noise data, compare the calculated noise metric with noise metric threshold values, dependent upon the calculated noise metric exceeding a noise metric threshold value for a particular region, gener-
(Continued)

ating a traffic rerouting signal, said traffic rerouting signal causing a traffic routing system to reroute traffic away from said particular region.

13 Claims, 7 Drawing Sheets

(51) Int. Cl.
    *G08G 1/015*     (2006.01)
    *G08G 1/087*     (2006.01)
    *G08G 1/0968*     (2006.01)

(52) U.S. Cl.
    CPC ........... *G08G 1/015* (2013.01); *G08G 1/0116* (2013.01); *G08G 1/087* (2013.01); *G08G 1/096816* (2013.01); *G08G 1/096827* (2013.01); *G08G 1/09685* (2013.01)

(56) References Cited

U.S. PATENT DOCUMENTS

| | | | |
|---|---|---|---|
| 2007/0273552 A1 | 11/2007 | Tischer | |
| 2009/0052677 A1 | 2/2009 | Smith | |
| 2010/0030458 A1* | 2/2010 | Coughlin | B60W 40/09 |
| | | | 701/123 |
| 2010/0308986 A1* | 12/2010 | Dobryden | G08C 17/02 |
| | | | 340/438 |
| 2011/0140635 A1 | 6/2011 | Kim | |
| 2012/0188102 A1 | 7/2012 | Kalyanaraman et al. | |
| 2013/0009569 A1 | 1/2013 | Knibbe et al. | |
| 2013/0103311 A1* | 4/2013 | Yanase | G01C 21/3676 |
| | | | 701/527 |
| 2013/0325308 A1 | 12/2013 | Friedlander et al. | |
| 2015/0008325 A1 | 1/2015 | Mans et al. | |
| 2015/0102745 A1 | 4/2015 | Pijlman et al. | |
| 2015/0278690 A1 | 10/2015 | Bialk et al. | |
| 2016/0131358 A1* | 5/2016 | Spiro | H05K 1/115 |
| | | | 455/561 |
| 2016/0232775 A1 | 8/2016 | Scheper et al. | |
| 2016/0286629 A1 | 9/2016 | Chen et al. | |
| 2016/0334228 A1 | 11/2016 | Wang | |
| 2017/0154525 A1* | 6/2017 | Zou | G08G 1/08 |
| 2018/0075739 A1* | 3/2018 | Ginsberg | G08G 1/0145 |
| 2020/0109959 A1* | 4/2020 | Wu | G01C 21/3484 |

FOREIGN PATENT DOCUMENTS

| | | |
|---|---|---|
| CN | 104931061 A | 9/2015 |
| EP | 1913346 A1 | 4/2008 |
| JP | 10232137 A | 9/1998 |
| JP | 3293508 B2 | 6/2002 |
| KR | 100984837 A | 10/2010 |
| WO | 201420213 A1 | 2/2014 |
| WO | 2014020213 A1 | 2/2014 |
| WO | 2015187326 A1 | 12/2015 |

* cited by examiner

LIGHTING SYSTEM WITH TRAFFIC REROUTING FUNCTIONALITY

CROSS-REFERENCE TO PRIOR APPLICATIONS

This application is the U.S. National Phase application under 35 U.S.C. § 371 of International Application No. PCT/EP2018/066802, filed on Jun. 22, 2018, which claims the benefit of European Patent Application No. 17178932.4, filed on Jun. 30, 2017. These applications are hereby incorporated by reference herein.

FIELD OF THE INVENTION

The invention relates to a lighting system for illuminating an environment, a vehicle routing device, a lighting method for illuminating an environment, and a computer readable medium.

BACKGROUND

Noise has always been an important environmental problem for humankind. Already in the ancient Rome, rules were set regarding the noise emitted from the ironed wheels of wagons, which battered the stones on the pavement. In Medieval Europe, horse carriages and horseback ridings were not allowed during nighttime. However, over time the noise problems became more severe, due to the modernization of traffic e.g., aircraft, trains, cars and heavily laden lorries with diesel engines.

The extent of the noise problem nowadays is large; it has been shown that in the countries of EU-25 during the daytime about 44% of the population (210 million people) and during the nighttime about 30% of the population (140 million people) are exposed to road traffic noise with an equivalent sound pressure level exceeding 55 dB(A). Furthermore, more than 54 million people were exposed to road traffic noise levels over 65 dB(A)—this is ten times louder than the WHO guideline value. Data collected in time periods of 24 hours alongside densely traveled roads showed that the equivalent sound pressure level ranged between 75 and 80 dB(A).

Noise pollution has an impact on the health of people and animals. Out of the total social costs caused by road traffic noise in Europe, passenger cars and lorries account for 90%. The negative effects of noise on humans are noticeable in various ways such as speech intelligibility, hearing impairment, sleep disturbance, mental illness, decrease in performance, negative social & behavioral changes (annoyance) or as disturbances in physiological functions e.g., increased blood pressure, ischemic heart disease (245.000 people in the EU25 had the disease due to noise in 2000). ("Noise and Health", by Passchier and Vermeer; "Guidelines for Community Noise", by Berglund and Lindvall).

Figure 1A:
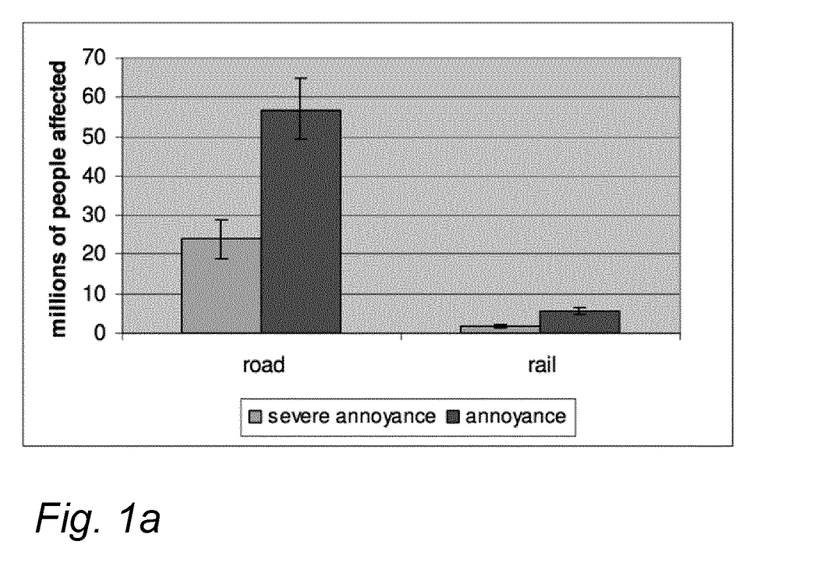
FIG. 1a is graph showing the percentage of people living in countries of EU25 who were affected by noise pollution alongside roads.

FIG. 1a shows that the percentage of people living in countries of the EU25, who were affected by noise pollution alongside roads, goes up to ~55%. This figure covers the EU-27 countries, except Cyprus and Malta. To express the uncertainty in the estimates a band width for the results is shown. The upper and lower bound of this band width were estimated by varying the exposure figures by 2 dB(A).

Figure 1B:
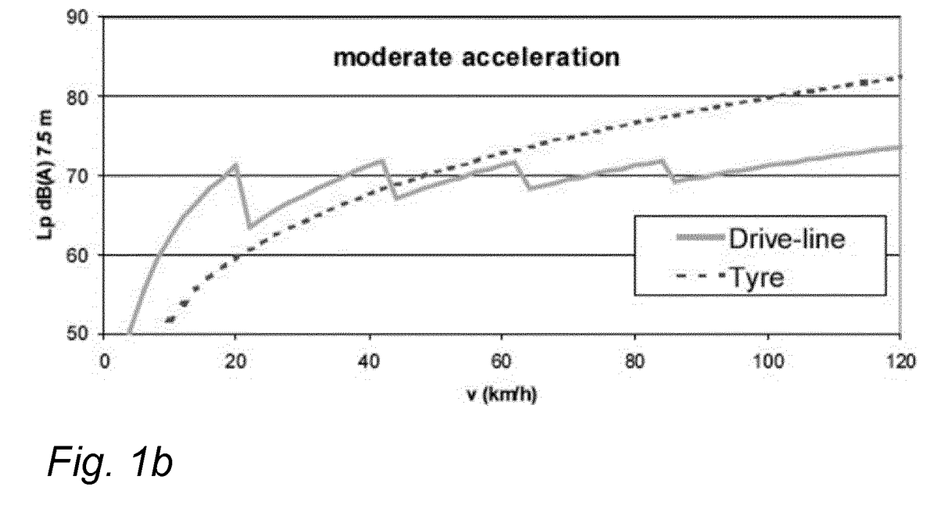
FIG. 1b is a graph showing a correlation between speed and noise emission for a passenger car, FIG. 2a schematically shows an example of an embodiment of a lighting system, FIG. 2b schematically shows an example of an embodiment of lighting modules.

FIG. 1b shows the correlation between speed and noise emission for a passenger car, in particular vehicle driveline noise versus tire noise. The two main noise sources in road transport are the vehicle driveline and tire/road contact. The higher its speed, the more noise a vehicle produces. This graph shows the relationship between speed and noise emission for both driveline and tires. At lower speeds driveline noise predominates, with the noise of tire-road contact becoming most important as speed increases. The jagged line follows gear changes. FIGS. 1a and 1b are both taken from "Traffic noise reduction in Europe" by L. C. den Boer and A. Schroten.

Current solutions for noise pollution prevention focus on preventing the noise from entering a specific area, e.g., a house, or reducing the noise level in the area. For example, sound reflecting windows, walls or other types of materials are used to absorb sound waves, but have the disadvantage of changing the cityscape. In the past other solutions/methods were also tried, such as noise regulations for traffic users but they may fail due to unrealistic laboratory conditions, which do not reflect actual, real-life, traffic situations.

SUMMARY OF THE INVENTION

A lighting system for illuminating an environment is provided which addresses some of these concerns. The lighting system comprises:
  a plurality of lighting modules, the lighting modules comprising:
  a light source for emitting light, illuminating an area,
  an acoustic sensor arranged for sensing noise in the area,
  a network interface configured to allow the lighting module to send noise data via a network, and
  a vehicle routing device comprising:
  a first network interface configured to receive noise data from the plurality of lighting modules via the network,
  a processor circuit arranged to:
  calculate noise metrics for different regions in the environment from the received noise data,
  compare the calculated noise metric with noise metric threshold values,
  dependent upon the calculated noise metric exceeding a noise metric threshold value for a particular region, generating a traffic rerouting signal, said traffic rerouting signal causing a traffic routing system to reroute traffic away from said particular region, and
  wherein the vehicle routing device comprises a memory arranged to store a digital map of the environment, the processor circuit of the vehicle routing device being arranged to estimate future noise metrics as a result of rerouting according to the traffic rerouting signal, transmitting the traffic rerouting signal being dependent upon the estimated future noise metrics improving the calculated noise metrics.

Through the combination of acoustic sensors distributed over an environment, say over a city and a vehicle routing device rerouting signals can be generated to better distribute or reduce the noise pollution.

In an embodiment, the vehicle routing device is arranged to compute noise metrics for multiple vehicle types, the traffic rerouting signal being generated for one or more specific vehicle types, said traffic rerouting signal causing the traffic routing system to reroute traffic of the one or more specific vehicle types away from said particular region. Road traffic noise pollution may be reduced using an intelligent lighting infrastructure. By generating rerouting signals detected noise is addressed.

The lighting modules and vehicle routing device are electronic devices. For example, they may comprise electronic memory and an electronic processor.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 3 shows an example of a noise spectrum over time, FIG. 4 schematically shows an example of a map of a city, FIG. 5 schematically shows an example of an embodiment of a lighting method, FIG. 6a schematically shows a computer readable medium having a writable part comprising a computer program according to an embodiment, FIG. 6b schematically shows a representation of a processor system according to an embodiment.

LIST OF REFERENCE NUMERALS IN FIGS. 2A AND 4

100 a lighting system
110 a plurality of lighting modules
111, 112, 113 a lighting module
111a a light source
111b an acoustic sensor
120 a vehicle routing device
121 a first network interface
122 a second network interface
123 a traffic routing system
124 a traffic signage system
125 a car navigation system
131 a noise metric calculation unit
132 a noise comparison unit
133 a traffic planning unit
134 a map memory
135 a vehicle detection unit
300 a map of a city
301-307 a lighting module
321-324 an electronic road signage system
331 a smaller road
330 an inner city
340 a larger road
341-345 a region

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 2A:
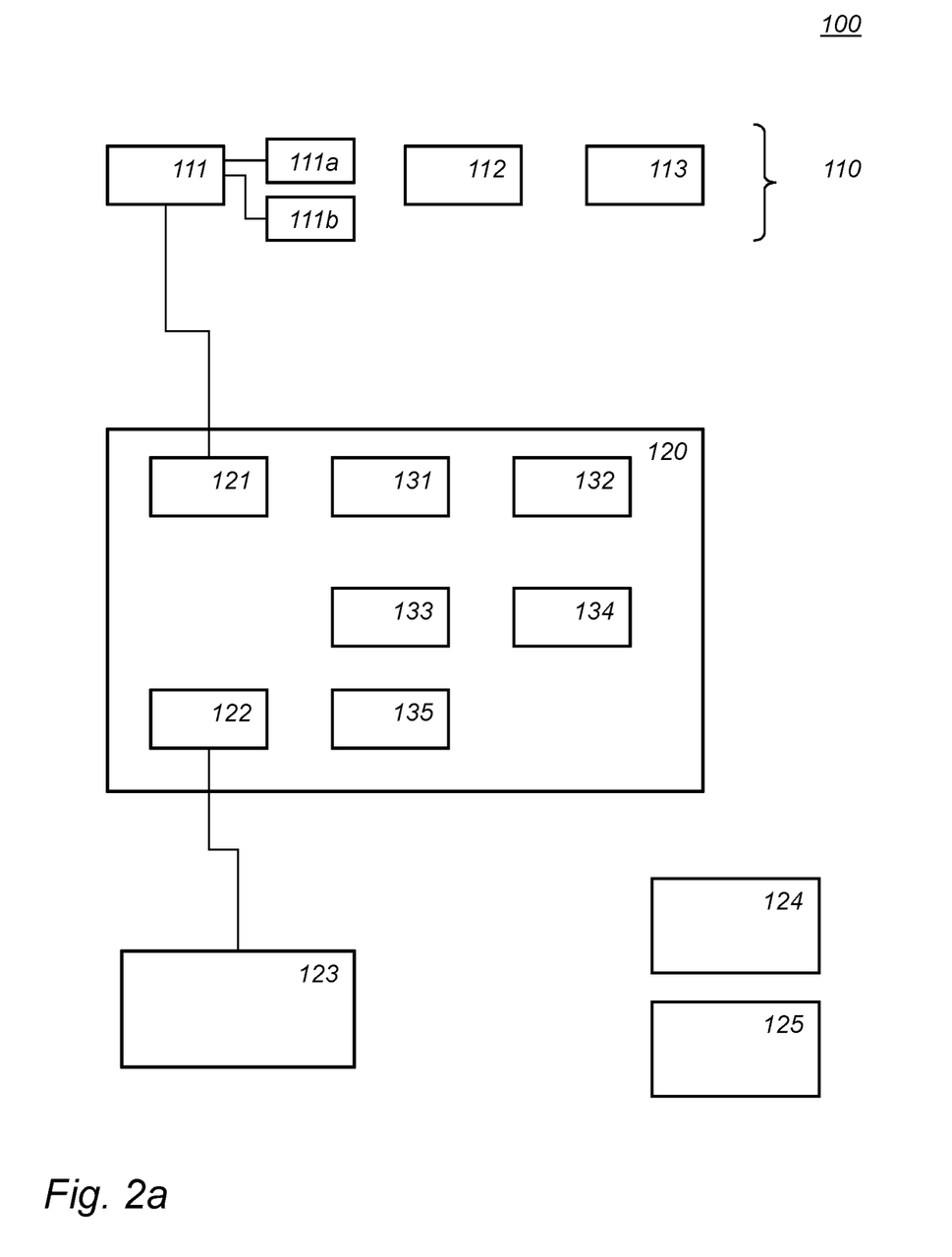

FIG. 2a schematically shows an example of an embodiment of a lighting system 100. The lighting system is arranged for illuminating an environment, e.g., one or more roads, e.g., a city or part thereof, etc. Lighting system 100 comprises a plurality of lighting modules 110. Shown in FIG. 2a, plurality 110 comprises lighting modules 111, 112, 113. The lighting modules comprise a light source 111a for emitting light. The light illuminates an area around the lighting module, e.g., part of a road. The lighting modules also comprises an acoustic sensor 111b arranged for sensing noise in the area. For example, the acoustic sensor may be, e.g., a microphone. The lighting module further comprises a network interface configured to allow the lighting module to send noise data via a network (not shown separately in FIG. 2a). The light source and acoustic sensor are only shown for lighting module 111. There may also be lighting modules part of lighting system 100 that do not comprise an acoustic sensor or a network connection. Below we will focus only on lighting modules with both. Preferably, the lighting system is a so-called smart connected lighting system in which a public lighting collects data using sensors and is controlled to adapt to circumstances.

Noise data may be an audio recording of the sound in the area associated with the sensor. For example, noise data may be converted from analog to digital. Noise data may be in the form of clips that are periodically forwarded or streamed to a back-end, e.g., the vehicle routing device 120 discussed below. For example, the noise data may be raw noise data, e.g., as recorded after A/D conversion by an AD converter (ADC) of the lighting module. In an embodiment, the lighting module comprises a processor circuit configured to process the raw noise data before sending the noise data to the back-end. For example, the processing may comprise deriving a volume of the noise data, e.g., for sequential time intervals, e.g., for sequential 0.1 second intervals. The processing may compress the noise data, e.g., by removing high frequency components, etc. In an embodiment, the processing may comprise classifying the noise data, e.g., into estimated number of vehicles, estimated vehicle type or types, etc.

A particular advantageous choice for the lighting system is a street lighting system in which at least multiple of the lighting modules are comprised in lighting poles. An example of such a street lighting system is shown in FIG. 2b.

Figure 2B:
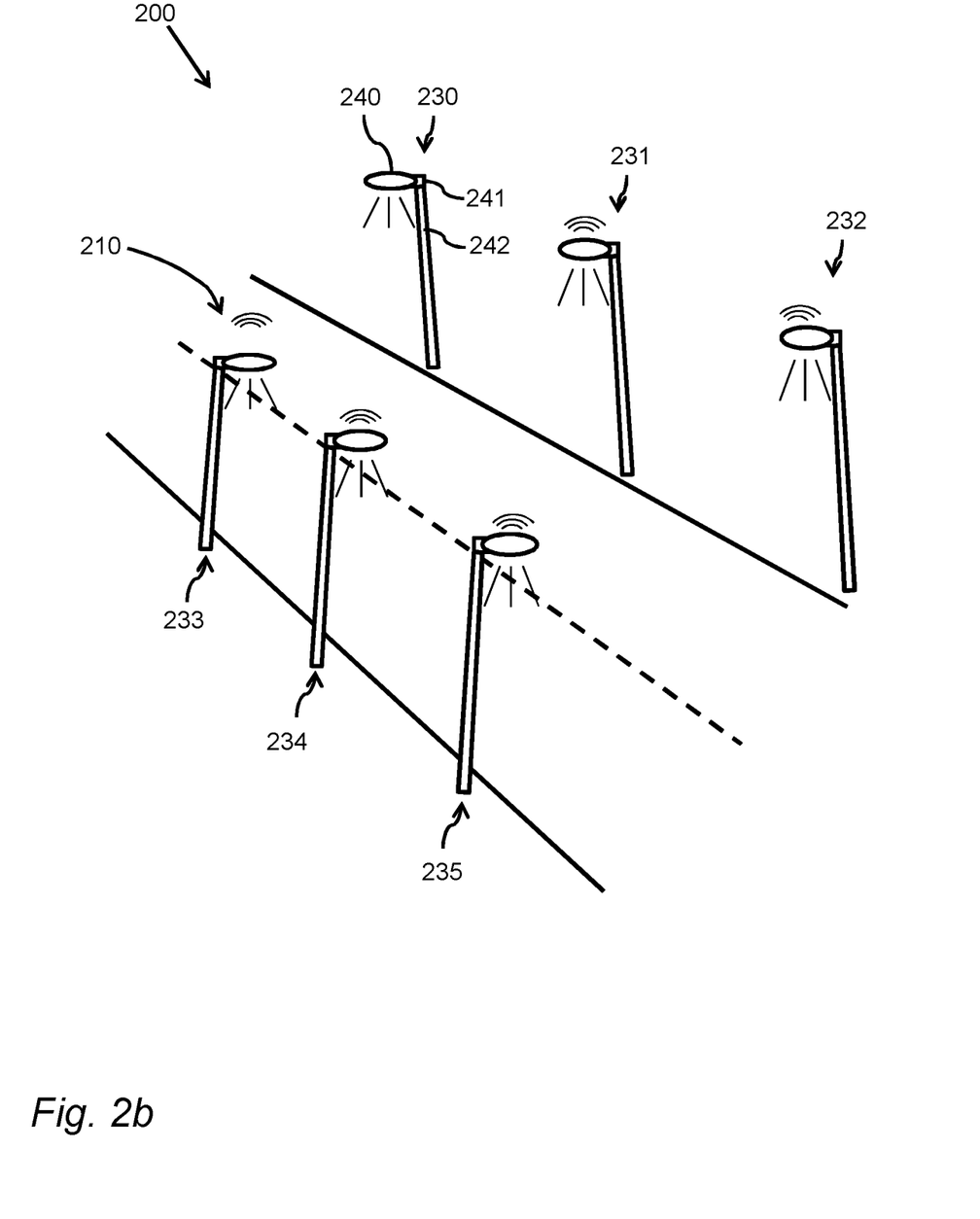

FIG. 2b schematically shows a street 210 with a street lighting system 200 in which one or more embodiments of a lighting modules are provided. Along the street there are lighting poles 230 . . . 235 which form the street lighting system 200. In this document, the term lighting pole refers to the pole itself together with the light fixture at the top of the pole and additional optional driving circuitries provided in the pole and/or in the light fixture at the top of the pole. For lighting pole 230 distinct elements have been indicated, namely the light fixture 240, a pole 242 and a construction element 241 at the top of the pole which comprises, for example, a driving circuitry for driving the lamp in the light fixture 240. In an example, the plurality of lighting modules 110 of FIG. 1 is provided in the lighting poles. For example, lighting module 111 may be provided in lighting pole 230. For example, the acoustic sensor 111b is provided in the light fixture 240 and is focused on the street below the lighting pole 230. As such, a portion of the street close to lighting pole 230 is an area associated with this sensor. Other elements of the system 100 are, for example, provided in the element 241 that also comprises the driving circuitry of the lamp. As discussed previously, the fixture 240 may also comprise a lamp, which may be the lamp of the lighting pole that illuminates the portion of the street 210. The lighting pole may be connected to a digital network via a wire or wireless connection for transmitting the noise data.

Returning to FIG. 2a. Lighting system 100 further comprises a vehicle routing device 120. The vehicle routing device 120 comprises a first network interface 121 configured to receive noise data from the plurality of lighting modules via the network. For example, the lighting modules may comprise a wireless network interface, such as WiFi or ZigBee, etc., or a wired interface, such as Ethernet, Power over Ethernet, etc. First network interface 121 is connected via a digital network, e.g., an LAN, WAN, e.g., the Internet, etc., to the plurality 110. Interface 121 may be wired or wireless. Possibly an intermediary is used between vehicle routing device 120 and a lighting module(s), such as a router, a hub, etc. (not shown separately in FIG. 2a). Vehicle routing device 120 may receive the location of the lighting pole, or lighting module with the noise data; or instead receive an identifier of the lighting module a look-up the location of the lighting module associated with the identifier. The first network interface may be a light-sensory network (LSN) interface.

Vehicle routing device 120 comprises a processor circuit arranged to reroute traffic on the basis of noise data received from a plurality of acoustic sensors. The execution of the algorithms used by vehicle routing device 120 is implemented in the processor circuit, examples of which are shown herein. FIG. 2a shows functional units that may be functional units of the processor circuit. For example, FIG. 2a may be used as a blueprint of a possible functional organization of the processor circuit. The processor circuit is not shown separate from the units in FIG. 2a. For example, the functional units shown in FIG. 2a may also be wholly or partially be implemented in computer instructions that are stored at vehicle routing device 120 and are executable by a microprocessor of vehicle routing device 120. In hybrid embodiments, functional units are implemented partially in hardware, e.g., as coprocessors, e.g., signal processing coprocessors, and partially in software stored and executed on the vehicle routing device 120.

Vehicle routing device 120 comprises a noise metric calculation unit 131 configured to calculate noise metrics for different regions in the environment from the received noise data. A region corresponds to one or more areas. For example, the regions may be the same as the areas associated with the lighting modules, e.g., in a one-to-one correspondence. For example, a noise metric may be a volume of noise data, or the energy in the noise signal, or the energy per unit of time, e.g., per second. For example, one may determine energy of an audio sample by performing a Fourier transform and compute the energy of each frequency bin by multiplying its value with its complex conjugate, and summing over the frequency bins. The noise metric may be a weighed sum or weighted average of the frequency bins; for example, lower frequency bins may receive a higher weighting. The noise metric may indicate volume of traffic, in particular motorized traffic in the region less directly. For example, a classification may be performed of the number and types of vehicles in the region. From this the potential volume of the number and types of vehicles may be determined, e.g., computed or by look-up in a table. For example, the potential volume may be determined for each vehicle type in the region and added, e.g., times the number of those vehicle types. Vehicle types, may be e.g., small and large, e.g., for passenger cars, versus lorries, and trucks, etc. For example, potential volume may be volume at a fixed speed, e.g., at 40 km/h, or during certain operations, e.g., braking, or a weighted average thereof.

One or more of the regions may correspond to multiple areas. For example, two or more areas may be combined into a single region. To combine multiple areas into a region the data corresponding to each area may be added. For example, each area may be geographically comprised in exactly one region. A volume metric for a region may also be a weighted sum, of the areas in the region or partially in the region, or close to the region.

Vehicle routing device 120 comprises a noise comparison unit 132. Noise comparison unit 132 is configured to compare the calculated noise metrics with noise metric threshold values. For example, noise comparison unit 132 may classify regions as below an acceptable noise level, or above an acceptable noise level. The acceptable noise level may be predetermined, e.g., implemented as a threshold against which to compare the noise metric. For example, noise comparison unit 132 may classify regions as well below an acceptable noise level, nearing an acceptable noise level, or as above the acceptable noise level. The latter may be implemented as below a first threshold, between the first threshold and a second threshold, and above the second threshold.

Vehicle routing device 120 comprises a traffic planning unit 133 configured to, dependent upon the calculated noise metric exceeding a noise metric threshold value for a particular region, generating a traffic rerouting signal. Traffic rerouting signal may be arranged to cause the traffic routing system to reroute traffic away from said particular region.

For example, the classification of regions may be used to route traffic. For example, traffic planning unit 133 may attempt to route traffic away from a region in which noise is above acceptable and towards a region in which it is well below it, preferably avoiding regions in which the noise nears the acceptable level. In an embodiment, traffic in a high noise region is given preference, e.g., by giving priority to traffic lighting or reduce speed through electronic signage so that traffic in this area needs to break less and can drive at a more constant speed.

Vehicle routing device 120 comprises a map memory 134. Map memory 134 is configured to store a digital map of the environment, e.g., said environment comprising the regions and areas. The map memory is optional, for example, in an embodiment the received noise data may be directly used as a signal to start local rerouting operations, e.g., by prioritizing or slowing traffic. In an embodiment, the map is digitally annotated with the noise metrics, or classifications, etc. Using the map more advanced rerouting operations are possible. For example, all traffic or traffic of a certain type may temporarily be routed across a different route.

In a more advanced embodiment, traffic planning unit 133 is configured to estimate future noise metrics as a result of rerouting according to the traffic rerouting signal. The future noise metric may be estimated for one particular region or for a plurality of regions. Depending upon the estimated future noise metrics improving the calculated noise metrics the traffic rerouting signal is used or not. There are a number of traffic rerouting signals that may be used to affect traffic and thus distribution of noise across the environment. Vehicle routing device 120 comprises a second network interface 122 configured to transmit the traffic rerouting signal to an external traffic routing system. Device 120 may also be integrated with traffic routing system 123. In this case, the second network interface may be omitted. By estimating future noise metrics as a result of rerouting according to the traffic rerouting signal, it may be prevented that due to rerouting of traffic in a particular region, the noise metric in another region may increase to a too high level, or even above the noise metric threshold value for that another region.

The system can be arranged as a centralized system, e.g., with a central server which collects information from connected lighting modules to decide upon a rerouting action, or as a de-centralized system, e.g., using a peer-to-peer protocol to communicate information between connected peer lighting modules. For example, a vehicle routing device may be installed in a lighting module, or multiple cooperating vehicle routing devices may be installed in multiple lighting modules. It is not necessary that all lighting modules have a vehicle routing device even in a peer-to-peer network. For example, some lighting modules may be enhanced lighting modules, e.g., acting as local collecting points for noise information, while some lighting modules are arranged with an acoustic sensor and send noise data to an enhanced lighting module, e.g., to an enhanced lighting module associated with that particular lighting module.

The enhanced lighting modules can decide on a rerouting action together, without communicating with a central back-end system. For example, an enhanced lighting modules may detect noise over a threshold, e.g., in a region, and request a rerouting based on the information it received from other lighting modules. In an embodiment, a re-routing decision uses information from multiple lighting nodes. This has the advantage that a more global view on the situation to re-route is achieved.

A first example of an external traffic routing system and corresponding type of traffic rerouting signal is a traffic signage system 124. Traffic signage system 124 is indicated in FIG. 2a as one option for traffic routing system 123. Interface 122 may be configured to communicate with traffic signage system 124 over a digital network, e.g., an intranet, the internet, etc. The traffic signage system 124 may operate traffic lights. The traffic rerouting signal may be configured to instruct the traffic signage system 124 to prioritize a particular traffic light, e.g., to reduce the time until it turns to green, or to extend the time the light stays green. The traffic rerouting signal may be configured to instruct the traffic signage system 124 to open a so-called green wave. A vehicle travelling along with the green wave at an appropriate speed will see a progressive cascade of green lights, and does not have to stop at intersections. This reduces noise because less acceleration and braking is needed. The speed may be set statically or dynamically, e.g., using electronic signage indicating the appropriate speed. A lower speed also contributes to lower noise.

For example, in an embodiment, the traffic planning unit may determine from the comparison of the noise metric with threshold values along which routes noise levels are critical, e.g., near or above a threshold. Accordingly, the traffic planning unit may initiate a green wave along that route. For example, in an embodiment, traffic signage system 124 is configured with multiple routes along which a green wave may be initiated, possibly some of which are mutually exclusive, e.g., because they cross. Traffic planning unit 133 may determine along which of the multiple routes noise levels are most critical and generate a signal for the traffic signage system 124 to start the green wave along the critical route. Because of the green wave, acceleration/deceleration noise and in particular braking noise is reduced.

For example, in an embodiment, the environment comprises a sequence of regions along a road, some of regions being near a traffic light along the road and some regions being in-between traffic lights. The vehicle routing device may be arranged to generate a traffic rerouting signal configuring the traffic lights along the road in a green wave if one or more particular regions being near the traffic light exceed a noise metric threshold value. For example, the particular regions may be predetermined regions.

Traffic signage system 124 may in addition or instead comprise electronic signage boards, e.g., variable message road signs. For example, the signage boards may be instructed to close or open certain roads, to re-route traffic from one part of the city to another. Interestingly, this can be highly dynamic, e.g., for only a few minutes, e.g., if a number of trucks approach an intersection, e.g., a traffic light. The electronic signage may also be vehicle specific, for example, a message may be displayed specifically for certain vehicles types. For example, a variable-message sign may display a message that instructs, say, trucks to reduce speed, turn right, etc.

Another way to route traffic are car navigation systems. A car navigation system is indicated at 125 and may be used as traffic routing system 123. Typically, a plurality of car navigation systems are used, e.g., one car navigation systems each for a plurality of vehicles. The vehicles with a car navigation system may be any motorized vehicle, in particular cars, or may be restricted to some particular type, in particular trucks. Through car navigation system 125, the traffic planning unit can directly reroute particular vehicles.

For example, in an embodiment, car navigation system 125 may comprise a vehicle routing device arranged to plan a route for the vehicle in which it is installed. For example, the car navigation system 125 may receive in the traffic rerouting signal information indicating in which regions noise is critical and are to be avoided. This may be implemented by augmenting a shortest path algorithm by artificially increasing the length of roads with a factor related to the noise criticality. As a result, the algorithm will try to avoid road with high noise but will not be prohibited from taking such roads altogether. Thus, if the vehicle is destined for a location in a critical region the navigation device will still be able to compute a route. For example, the factor with which road are lengthened, which may be expressed as relative factor, say a percentage, or an additive factor, say a penalty, or combination thereof, may be different for different vehicle types. For example, the factor may be larger for trucks than for passenger cars. The factor may be stored in the navigation device itself or may be encoded in the traffic rerouting signal. For example, the vehicle routing device may be configured with a dynamic path planning algorithm based on real-time traffic information.

An alternative is that the traffic planning unit 133 computes the route itself. For example, vehicle routing device 120 may be configured to receive a starting point and a destination point in the environment from the car navigation device, and to plan a route optimized for low noise regions, e.g., using the algorithms indicated above. The traffic rerouting signal may comprise the plan, e.g., navigation instructions, etc., and is transmitted to a car navigation system, e.g., over the second interface 122.

Optionally, vehicle routing device 120 comprises a vehicle detection unit 135. Vehicle detection unit 135 is configured to classify the traffic sensed by the acoustic sensor. For example, vehicle detection unit 135 may be configured to receive as input a noise clip and to produce an estimate of the noise compositions. For example, the estimated noise composition may be x motorized vehicles-non-trucks and y motorized vehicles-trucks, e.g., per sound clip or per time period, e.g., per minute. Vehicle detection unit 135 may be more simply configured to recognize the difference between trucks and cars. For example, vehicle detection unit 135 may be configured to produce a classification, e.g., truck-detected versus no-truck detected, or more advanced, truck-detected, motorized-vehicle-no-truck detected, or non-motorized-vehicle detected. Interestingly using an acoustic sensor is more accurate than using a proxy such as digital footprint such as mobile phone signals, since an acoustic signal is directly related to the noise level and moreover allows a determination of vehicle type. In an embodiment, detection unit 135 may give a noise metric per vehicle type.

Detection of road users is done by using sensors, such as a microphone, which are embedded in the light point. Sound sensors are preferred since they provide real-time conditions of the traffic users, such as tire wear, motor conditions, manufactural changes to the vehicle that affect the noise level of the car, e.g., exhaust system, air resistance. With other sensors, it is more difficult to detect these types of changes and measure the actual impact at specific time and space. In an embodiment, the lighting modules comprise a camera. The camera may be used to vehicle type detection, and the acoustic sensor for noise detection.

Figure 3:
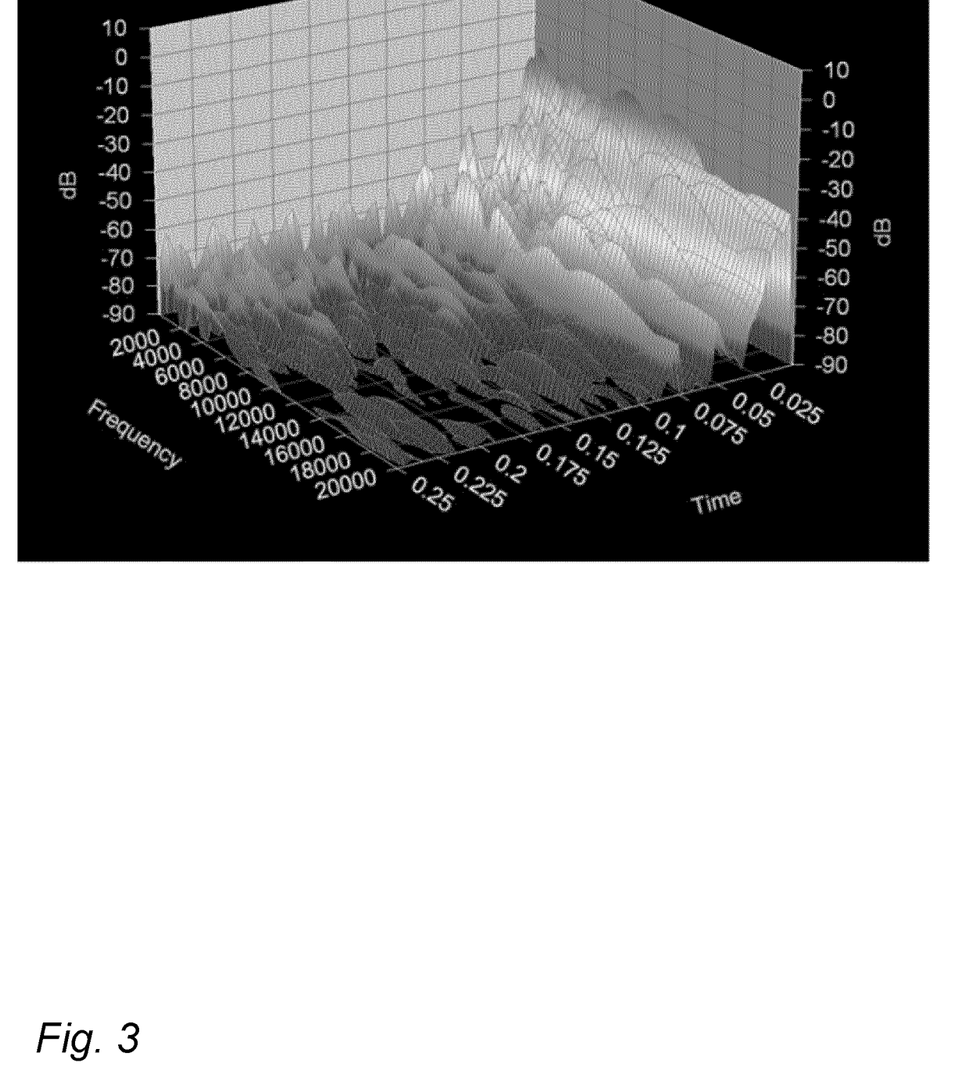

To detect traffic, or even traffic type or composition, the received sound information may be analyzed taking decibel level, frequency, time and others into account. A certain sound spectrum over time is generated and can be coupled to a specific vehicle type or a combination of several types of vehicles, e.g., based on motor and tire sound. Based on the sound spectrum information the current traffic composition may be determined. FIG. 3 shows an example of a noise spectrum over time.

In a possible embodiment, one or more secondary data streams are used to validate and calibrate the audio sensors. This can be done via additional sensors embedded in the light point, e.g., a camera, may be used to gather information regarding the traffic intensity, composition, traffic noise pollution, etc. This information may be used in a self-learning algorithm to detect traffic compositions via audio sensors. In the patent application additional information regarding recognition of vehicle types from audio data may be obtained from a patent application with title "Pollution estimation system" filed with the EPO with application number EP17158460.0. Returning to FIG. 2a, vehicle detection unit 135 may be used in a number of ways. For example, the rerouting may be dependent upon detection of certain vehicle types. For example, in an embodiment, vehicle routing device 120 may be arranged to compute noise metrics for multiple vehicle types. The traffic rerouting signal may be generated for one or more specific vehicle types. For example, if most noise comes from trucks the said traffic rerouting signal may cause traffic routing system 123 to reroute only trucks, e.g., away from said particular region, e.g., by prioritizing traffic lights or using electronic signage. However, if both trucks and passenger cars have a sizable contribution to the noise, the system may reroute all traffic, regardless of type.

For example, in an embodiment vehicle routing device 120 may be arranged to detect one or more vehicles of a particular vehicle type from the noise data in a region approaching a traffic light, the traffic rerouting signal being generated to cause the traffic light to give priority to the one or more approaching vehicles.

In an embodiment, regions are determined where the noise level is over a threshold, e.g., where the noise is critical or near-critical. Vehicle routing device 120 may reroute a truck so that it does not enter such a region. For example, the truck may be steered along a different route though its car navigation system. At the same time, the rerouting can take into account that trucks should not be sent through a predetermined set of roads, e.g., roads that are too small, too dangerous, etc.

In an embodiment, different types of vehicles are distributed differently. For example, the distribution of cars vs trucks; trucks make more noise so the algorithm may be configured to estimate the expected noise level of sending a truck to one route compared to a car, or multiple cars. This may be achieved by giving more priority to trucks when distributing. This works well since routing of trucks is often less complex than for cars. Moreover, one can aim to have trucks as much as possible outside of the areas, where low noise is required. Different vehicle types may be distributed based on the expected noise they make. For example, some number of cars, e.g., 3 cars, are still less loud than a single truck. So, the algorithm could trade, say, 5 cars routed away from a region in exchange for routing a single truck to the region.

Embodiments, thus address road traffic noise pollution using an intelligent lighting infrastructure and sensors, e.g., microphones, capable of detecting and classifying road users and re-directing them in order to reduce the total noise pollution, or improving its distribution. In an embodiment, the system classifies road users based on sensors data and re-directs them to other routes or optimizes their current route to improve the noise pollution. For example, an embodiment comprises a dense smart lighting infrastructure including receivers for receiving acoustic information. Various traffic users are detected based on sensor input including the location coordinates and other relevant information. The data collected via these sensors may be sent via a communication module, e.g., 4G/5G, fiber, etc., to a back-end or (partly) processed (sound classification) via an embedded microcontroller in on the device itself before send over to the back-end. The back-end system may have the ability to receive and store sensor data, e.g., sound levels/audio clips/ processed data such type of road users, of the smart lighting infrastructure, real-time traffic information and destination information of the road users. In a possible embodiment, the system is capable to communicate with third party systems in order to adjust, e.g., traffic intensity, traffic user composition, traffic density, road usage, etc. For example, the system may be capable of communicating with traffic management system for specific crossings or even on a city-wide level: when one or multiple trucks are detected in close proximity of a crossing that includes a traffic light, the system may send a message to the traffic management system of the traffic light to adjust the traffic lights to give priority to approaching lorries in such a way that the lorries are distributed in the area as evenly as possible. In another example, the same traffic data and historical data may be used to send a message to an in-car navigation system. The system may be configured to adjust the route and re-direct the user of the navigation system in order to decrease the noise pollution in a specific area. In a possible embodiment, the system may send preferred routing options towards a third party navigation system, e.g., in-car navigation systems, smartphone applications, navigation systems, dynamic traffic management systems to re-direct traffic users via an alternative route. The system may also be configured to receive navigation information, such as destination, of a navigation system to create the optimal route based on sound information and destination for a single user.

In an embodiment, vehicle routing device 120 is configured with an algorithm to: classify various road users in a certain area via the sensor information, e.g., specific audio signal patterns via frequency and amplitude. This can be done on the edge or on the backend, e.g., in the lighting module or in device 120. Determine the potential sound output of traffic users in various location based on current sound levels and new sound levels; Include car navigation information in combination with sound level output of the proposed traffic situation; Determine the most optimal route based on potential sound level output of the road users; and, Send a message with processed data through a messaging system to a third-party system, e.g., to an intelligent traffic management system, in-car system, car navigation system, etc.

In an embodiment, the proposed system is capable of detecting and classifying various types of traffic users by using embedded sensors, e.g., microphones, in the smart lighting grid and system that, based on the sensor information, classifies road users based on vehicle types in a specific area, e.g., small truck, lorry, passenger car. For example, based on the sound spectrum information, it may be determined that the current traffic composition and number of vehicles leads to noise pollution in an area, which is above the desired level. In that case, a message may be sent to one or more third party systems, e.g., traffic management systems, in car navigation, smart phones, etc., to influence the traffic composition, e.g., rerouting some traffic users, dynamic speed, close/open lanes, etc.

In an embodiment, the noise source has impact on the routing choices provided by the third-party systems, e.g., Traffic management system, in-navigation systems, traffic lights. For example, a large truck might make noise mostly when braking, whereas a motorbike is noisy when accelerating. Given that traffic conditions are known, e.g., that traffic lights are red, the routing strategy proposed by the system may be dependent upon the local weather, e.g., some road user may be manipulated to prevent him from breaking or accelerating, e.g., by prioritizing or deprioritizing him. This will reduce the noise pollution in some area and increase the traffic safety.

In a preferred embodiment, various types of users, who influence or are being influenced in a direct or indirect way by the noise pollution of traffic, may also be detected with the system, e.g., through sound classification. For example, cyclists, who are detected on high intensity roads, can be re-directed to another road to have more pleasant biking experience. For example, a cyclist may be redirected with signage. In a possible embodiment, other sensors, such as (infrared) cameras or PIR sensors are added to the system, e.g., to the lighting modules. These sensors detect other potential road users, such as cyclists, pedestrians, etc. who may be informed, if possible, and can be re-directed if they wish to have a more pleasant road experience. For example, such other users may be re-directed to have a better road experience, e.g., where the adjusted traffic with new road composition brings more pleasant experience. To detect other users of the road, e.g., cyclists or pedestrians other, the lighting modules may comprise visible light and/or infrared sensors configured. The vehicle routing device may be arranged to generate a traffic rerouting signal indicating a low noise route, e.g., through signage.

Figure 4:
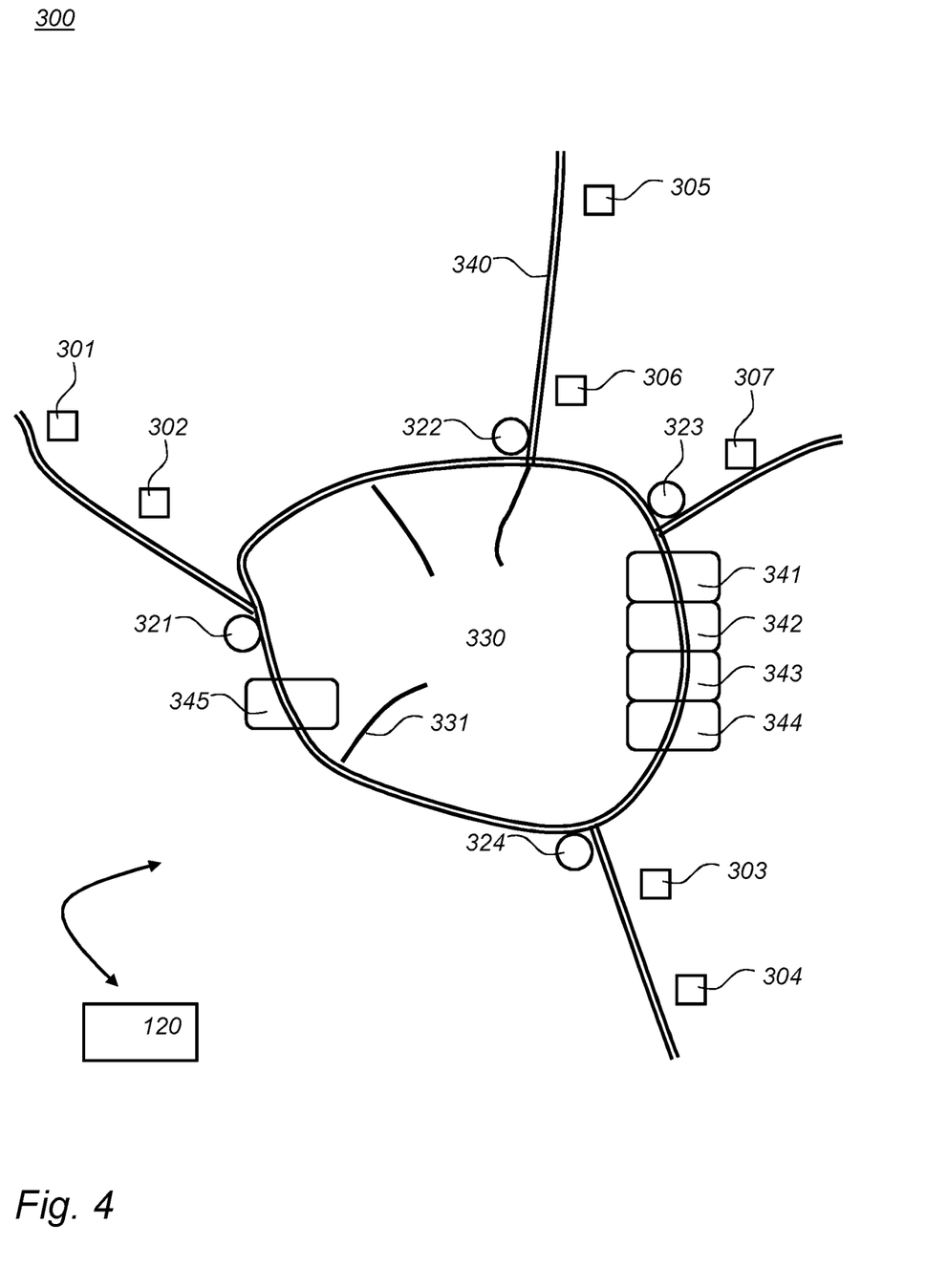

FIG. 4 schematically shows an example of a map 300 of a city. For example, a digital representation of map 300 may be stored in map memory 134. Map 300 shows larger or major roads 340 indicated with a double line, and smaller roads 331. The map of this city has only schematically been indicated, with most roads being omitted. The city center is schematically indicated at 330. The map show lighting modules as small squares. Shown are lighting modules 301-307. Electronic traffic signage systems are indicated with small circles. Shown are electronic road signage systems 321-324. Note that the larger roads form a bypass around the city center so that traffic that do not need to enter the center can bypass the city. Map 300 is subdivided in to regions, of which FIG. 4 only show a number: regions 341-345. The traffic signage systems and lighting modules are configured to communicate with vehicle routing device 120, which has been schematically included in FIG. 4.

In an embodiment, the lighting modules comprise a light source and an acoustic sensor and send noise data to vehicle routing device 120. The noise data may be raw noise data, or processed data. For example, the noise data may comprise noise levels, vehicle types, etc. The lighting modules may be configured remotely by vehicle routing device 120 to start or stop the sending of noise data. For example, vehicle routing device 120 may use this to focus only on a part of the city of interest at the moment, and control the data bandwidth. Vehicle routing device 120 may be part of a larger system that controls lighting through the lighting modules, e.g., increasing or decreasing lighting as required.

Vehicle routing device 120 is configured to calculate noise metrics for different regions from the received noise data. For example, from lighting modules in or near regions 341-345 (not all of which are shown in FIG. 4) the noise metric for these regions may be computed. These noise metrics may be compared with metric threshold values, and it may be determined that noise in regions 341-344 is critical. This may cause vehicle routing device 120 to generate a traffic rerouting signal.

For example, the traffic rerouting signal may instruct the signage at 322 to send traffic to the right, and/or signage at 324 to send traffic to the left. Moreover, the rerouting may be specific for certain vehicle types. As a result, the amount of traffic in regions 341-344 will decrease and thus the noise levels will decrease. The rerouting may be temporary. For example, traffic may be re-routed for only two minutes every ten minutes (say) to cause some decrease but not a total absence of traffic; or only if a specific type(s) of vehicle is approaching, e.g., large vehicles, e.g., trucks.

Before rerouting, the system may estimate the result of the re-routing for the noise metric in other regions. For example, it may be estimated that rerouting traffic at 324 to the left will cause a greater increase in region 345 than re-routing traffic from 322 to the right, since in the latter case some percentage of traffic may take the exit at 321. If the noise level in region 345 is itself at a critical level, the system may use this information to decide to use re-routing at 322 but not at 324. In this way it may be prevented that due to rerouting of traffic the noise metric in a certain region will decrease while simultaneously the noise metric in one or more other regions will increase, even above the noise metric threshold value.

Alternatively, vehicle routing device 120 may send a rerouting signal to in-car navigation devices informing a navigation module about the noise conditions. For example, the road between 323 and 324 may be increased artificially in length so that shortest path algorithms are dissuaded from taking that road. Yet if a user enters a destination in the regions 341-344, the navigation will still be able to find a route to that region.

The vehicle routing device 120 may have a user interface, which may include well-known elements such as one or more buttons, a keyboard, display, touch screen, etc. The car navigation system 125 may also have a user interface. The user interface may be arranged for accommodating user interaction for performing a navigation, starting a re-routing etc. Storage 134 may be implemented as an electronic memory, say a flash memory, or magnetic memory, say hard disk or the like. Storage 134 may comprise multiple discrete memories together making up storage 134. Storage 134 may also be a temporary memory, say a RAM. In the case of a temporary storage 134, storage 134 contains some means to obtain data before use, say by obtaining them over an optional network connection.

Typically, the device vehicle routing device 120, and the lighting modules 110 each comprise a microprocessor (not separately shown in FIG. 2a) which executes appropriate software stored at the devices 120 and 110; for example, that software may have been downloaded and/or stored in a corresponding memory, e.g., a volatile memory such as RAM or a non-volatile memory such as Flash (not separately shown). The devices 123, 124 and 125 may also be equipped with microprocessors and memories (not separately shown). Alternatively, the devices may, in whole or in part, be implemented in programmable logic, e.g., as field-programmable gate array (FPGA). Devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, vehicle routing device 120 comprises one or more of a first network interface circuit, a second network interface circuit, a noise metric calculation unit circuit, a noise comparison unit circuit, a traffic planning unit circuit, a map memory circuit, a vehicle detection unit circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 5:
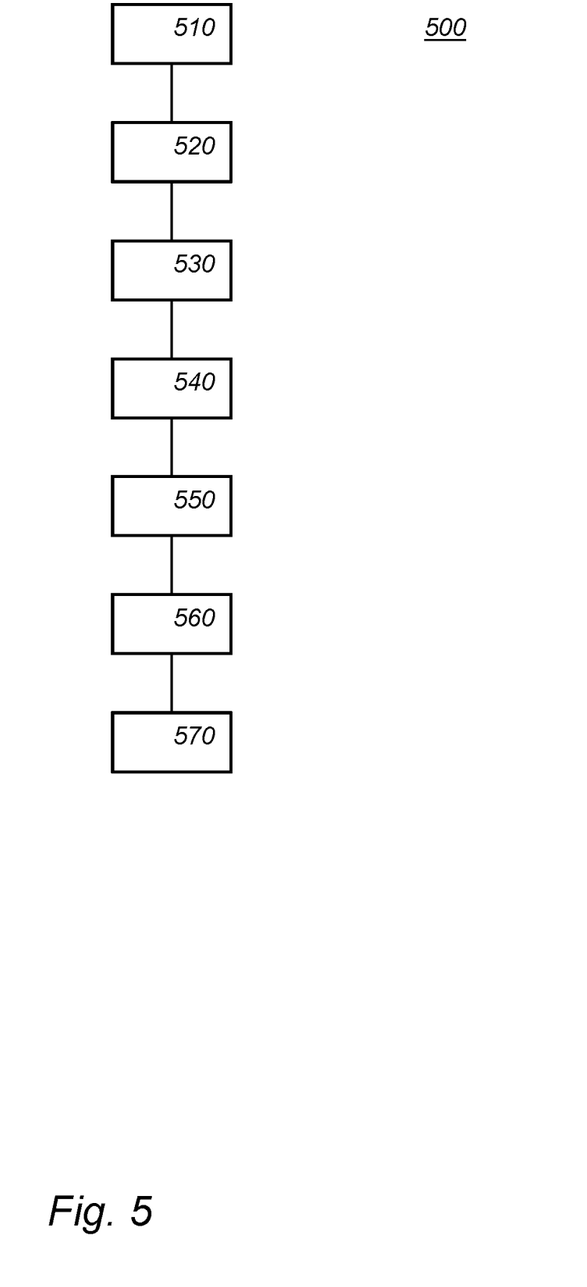

FIG. 5 schematically shows an example of an embodiment of a lighting method 500. Lighting method 500 is a method for illuminating an environment, in addition noise pollution is addressed. Lighting method 500 comprising illuminating 510 an area with a light source 111a, and sensing 520 noise in the area with an acoustic sensor. For example, the lighting may be centrally controlled, e.g., in response to external factors such as traffic density, weather conditions, time of day, and the like. A plurality of light sources may be used.

Method 500 further comprises:
receiving 530 the noise data via the network,
calculating 540 noise metrics for different regions 341-344 in the environment from the received noise data,
comparing 550 the calculated noise metric with noise metric threshold values,
dependent upon the calculated noise metric exceeding a noise metric threshold value for a particular region, generating 560 a traffic rerouting signal, said traffic rerouting signal causing the traffic routing system to reroute traffic away from said particular region, and
transmitting 570 the traffic rerouting signal to the external traffic routing system 123.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, the steps may be executed, at least partially, in parallel. Moreover, a given step may not have finished completely before a next step is started.

A method according to the invention may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

The following traffic routing system has been contemplated and is nonlimiting: a traffic routing system comprising a plurality of sensing modules (111, 112, 113), the sensing modules comprising an acoustic sensor (111b) arranged for sensing noise in the area, a network interface configured to allow the lighting module to send noise data via a network, and a vehicle routing device (120) comprising a first network interface (121) configured to receive noise data from the plurality of sensing modules via the network, a second network interface (122) configured to transmit a traffic rerouting signal to an external traffic routing system (123; 124), a processor circuit arranged to calculate noise metrics for different regions (341-344) in the environment from the received noise data, compare the calculated noise metric with noise metric threshold values, dependent upon the calculated noise metric exceeding a noise metric threshold value for a particular region, generating a traffic rerouting signal, said traffic rerouting signal causing the traffic routing system to reroute traffic away from said particular region transmitting the traffic rerouting signal over the second network interface.

Figure 6A:
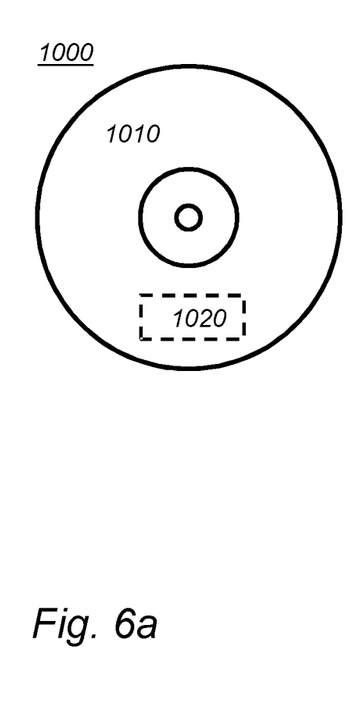

FIG. 6a shows a computer readable medium 1000 having a writable part 1010 comprising a computer program 1020, the computer program 1020 comprising instructions for causing a processor system to perform a lighting method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said lighting method.

Figure 6B:
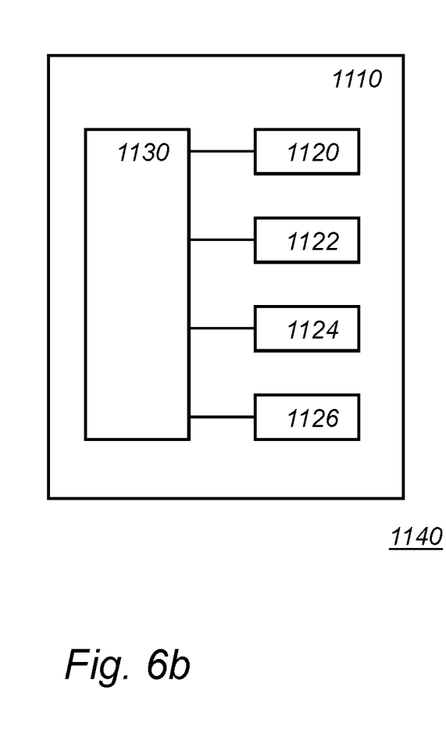

FIG. 6b shows in a schematic representation of a processor system 1140 according to an embodiment of a vehicle routing device. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively. The lighting modules may use a similar architecture but configured for lighting, sensing and transmitting, etc.

For example, in an embodiment, the vehicle routing device 120 may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software. It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A lighting system for illuminating an environment, the lighting system comprising:
a plurality of lighting modules, the lighting modules comprising:
a light source for emitting light, illuminating an area,
an acoustic sensor arranged for sensing noise in the area,
a network interface configured to allow the lighting module to send noise data via a network, and
a vehicle routing device comprising:
a first network interface configured to receive noise data from the plurality of lighting modules via the network,
a processor circuit arranged to:
calculate noise metrics for different regions in the environment from the received noise data,
compare the calculated noise metric with noise metric threshold values,
dependent upon the calculated noise metric exceeding a noise metric threshold value for a particular region, generating a traffic rerouting signal, said traffic rerouting signal causing a traffic routing system to reroute traffic away from said particular region, and
wherein the vehicle routing device comprises a memory arranged to store a digital map of the environment, the processor circuit of the vehicle routing device being further arranged to estimate future noise metrics as a result of rerouting according to the traffic rerouting signal, transmitting the traffic rerouting signal being dependent upon the estimated future noise metrics improving the calculated noise metrics.

2. The lighting system as in claim 1 comprising a second network interface configured to transmit a traffic rerouting signal to an external traffic routing system, wherein the processor circuit is arranged to transmit the traffic rerouting signal over the second network interface.

3. The lighting system as in claim 1, wherein the vehicle routing device is further arranged to compare the future noise metric for a first region to the calculated noise metric for the first region, to compare the future noise metric for a second region to the calculated noise metric for the second region, and transmitting the traffic rerouting signal dependent upon the comparison of the difference between the future noise metric and the calculated noise metric for the first and the second region, respectively.

4. The lighting system as in claim 1, the processor circuit of the vehicle routing device being arranged to compute noise metrics for multiple vehicle types, the traffic rerouting signal being generated for one or more specific vehicle types, said traffic rerouting signal causing the traffic routing system to reroute traffic of the one or more specific vehicle types away from said particular region.

5. The lighting system as in claim 1, wherein the processing circuit of the vehicle routing device is arranged to:
detect one or more vehicles of a particular vehicle type from the noise data in a region approaching a traffic light, the traffic rerouting signal being generated to cause the traffic light to give priority to the one or more approaching vehicles.

6. The lighting system as in claim 1, wherein the processing circuit of the vehicle routing device is arranged to:
include in the traffic rerouting signal noise metrics, said traffic rerouting signal being transmitted to car navigation systems arranged to plan a route optimized for low noise regions.

7. The lighting system as in claim 1, wherein the processing circuit of the vehicle routing device is arranged to:
receive a starting point and a destination point in the environment, and to plan a route optimized for low noise regions, the traffic rerouting signal comprising the plan and is transmitted to a car navigation system.

8. The lighting system as in claim 1, wherein the lighting modules comprise visible light and/or infrared sensors configured to detect other road users, the processor circuit of the vehicle routing device being arranged to generate a traffic rerouting signal indicating a low noise route.

9. A vehicle routing device comprising:
a first network interface configured to receive noise data from a plurality of lighting modules via a network, the noise data being sensed by acoustic sensors of the plurality of lighting modules arranged for sensing noise in an area,
a second network interface configured to transmit a traffic rerouting signal to an external traffic routing system,
a processor circuit arranged to:
calculate noise metrics for different regions in the environment from the received noise data,
compare the calculated noise metric with noise metric threshold values,
dependent upon the calculated noise metric exceeding a noise metric threshold value for a particular region, generating a traffic rerouting signal, said traffic rerouting signal causing the traffic routing system to reroute traffic away from said particular region,
transmitting the traffic rerouting signal over the second network interface,
wherein the vehicle routing device further comprises a memory arranged to store a digital map of the environment, the processor circuit of the vehicle routing device being arranged to estimate future noise metrics as a result of rerouting according to the traffic rerouting signal, transmitting the traffic rerouting signal being dependent upon the estimated future noise metrics improving the calculated noise metrics.

10. A vehicle routing device according to claim 9, wherein the vehicle routing device is further arranged to compare the future noise metric for a first region to the calculated noise metric for the first region, to compare the future noise metric for a second region to the calculated noise metric for the second region, and transmitting the traffic rerouting signal dependent upon the comparison of the difference between the future noise metric and the calculated noise metric for the first and the second region, respectively.

11. A lighting method for illuminating an environment, the lighting method comprising:
illuminating an area with a light source,
sensing noise in the area with an acoustic sensor,
receiving the noise data via the network,
calculating noise metrics for different regions in the environment from the received noise data,
comparing the calculated noise metric with noise metric threshold values,
dependent upon the calculated noise metric exceeding a noise metric threshold value for a particular region, generating a traffic rerouting signal, said traffic rerouting signal causing the traffic routing system to reroute traffic away from said particular region, and
transmitting the traffic rerouting signal to the external traffic routing system,
storing a digital map of the environment,
estimating future noise metrics as a result of rerouting according to the traffic rerouting signal,
transmitting the traffic rerouting signal being dependent upon the estimated future noise metrics improving the calculated noise metrics.

12. The lighting method for illuminating an environment according to claim 11, the lighting method further comprising:
comparing the future noise metric for a first region to the calculated noise metric for the first region,
comparing the future noise metric for a second region to the calculated noise metric for the second region,
transmitting the traffic rerouting signal dependent upon the comparison of the difference between the future noise metric and the calculated noise metric for the first and the second region, respectively.

13. A computer readable non-transitory medium having stored therein instructions for causing a processor system to execute a method for illuminating an environment, the medium comprising code for:
illuminating an area with a light source,
sensing noise in the area with an acoustic sensor,
receiving the noise data via the network,
calculating noise metrics for different regions in the environment from the received noise data,
comparing the calculated noise metric with noise metric threshold values,
dependent upon the calculated noise metric exceeding a noise metric threshold value for a particular region, generating a traffic rerouting signal, said traffic rerouting signal causing the traffic routing system to reroute traffic away from said particular region, and
transmitting the traffic rerouting signal to the external traffic routing system,
storing a digital map of the environment,
estimating future noise metrics as a result of rerouting according to the traffic rerouting signal,
transmitting the traffic rerouting signal being dependent upon the estimated future noise metrics improving the calculated noise metrics.

\* \* \* \* \*